US012593367B2

(12) United States Patent
Dong

(10) Patent No.: US 12,593,367 B2
(45) Date of Patent: Mar. 31, 2026

(54) RE-ASSOCIATION INDICATION METHOD AND APPARATUS, AND COMMUNICATION DEVICE

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 665 days.

(21) Appl. No.: 17/784,364

(22) PCT Filed: Dec. 11, 2019

(86) PCT No.: PCT/CN2019/124661
§ 371 (c)(1),
(2) Date: Jun. 10, 2022

(87) PCT Pub. No.: WO2021/114149
PCT Pub. Date: Jun. 17, 2021

(65) Prior Publication Data
US 2023/0047630 A1 Feb. 16, 2023

(51) Int. Cl.
| | |
|---|---|
| *H04W 12/08* | (2021.01) |
| *H04W 36/08* | (2009.01) |
| *H04W 36/28* | (2009.01) |
| *H04W 48/12* | (2009.01) |
| *H04W 76/11* | (2018.01) |
| *H04W 76/19* | (2018.01) |

(52) U.S. Cl.
CPC ........... *H04W 76/19* (2018.02); *H04W 36/08* (2013.01); *H04W 36/28* (2013.01); *H04W 48/12* (2013.01); *H04W 76/11* (2018.02)

(58) Field of Classification Search
None
See application file for complete search history.

(56) References Cited

U.S. PATENT DOCUMENTS

| | | | | | |
|---|---|---|---|---|---|
| 7,457,620 | B2 * | 11/2008 | Lam | ...................... | H04W 48/10 |
| | | | | | 455/434 |
| 7,471,664 | B2 * | 12/2008 | Qi | .......................... | H04L 12/66 |
| | | | | | 370/310 |
| 7,801,095 | B2 * | 9/2010 | Kil | ........................ | H04W 88/08 |
| | | | | | 455/452.2 |

(Continued)

FOREIGN PATENT DOCUMENTS

| | | |
|---|---|---|
| CN | 1933435 A | 3/2007 |
| CN | 101483894 A | 7/2009 |

(Continued)

*Primary Examiner* — Tuan A Tran

(74) *Attorney, Agent, or Firm* — Volpe Koenig

(57) ABSTRACT

A re-association indication method includes: sending a beacon frame of a multi-transport connection, the beacon frame with a plurality of transmission connections includes a re-association information element. The re-association information element includes indication information used for indicating re-association request frame transmission. The indication information for indicating transmission of the re-association request frame comprises a service identifier and connection identifier of at least one transmission connection for receiving the re-association request frame.

20 Claims, 4 Drawing Sheets

| First communication device | Second communication device |
|---|---|

101: Send a beacon frame with a plurality of transmission connections, the beacon frame includes a re-association information element; the re-association information element includes: indication information for indicating re-association request frame transmission

(56)                References Cited

U.S. PATENT DOCUMENTS

| | | | | |
|---|---|---|---|---|
| 7,836,166 B2 * | 11/2010 | Kuan | | H04W 12/06 |
| | | | | 714/39 |
| 7,930,729 B2 * | 4/2011 | Sim | | H04L 67/54 |
| | | | | 726/2 |
| 8,472,978 B2 * | 6/2013 | Montemurro | | H04W 4/029 |
| | | | | 455/434 |
| 9,986,491 B2 * | 5/2018 | Jeong | | H04W 48/16 |
| 10,660,026 B2 * | 5/2020 | Wu | | H04W 76/10 |
| 10,779,226 B2 * | 9/2020 | Yao | | H04W 48/14 |
| 10,827,428 B1 * | 11/2020 | Chu | | H04L 61/3015 |
| 2007/0097896 A1 | 5/2007 | Qi | | |
| 2008/0109885 A1 | 5/2008 | Sim et al. | | |
| 2009/0016247 A1 * | 1/2009 | Sood | | H04W 12/069 |
| | | | | 370/310 |
| 2010/0177756 A1 * | 7/2010 | Choi | | H04W 72/23 |
| | | | | 370/338 |
| 2013/0272289 A1 * | 10/2013 | Yao | | H04W 48/16 |
| | | | | 370/338 |
| 2014/0133451 A1 * | 5/2014 | Li | | H04L 5/003 |
| | | | | 370/329 |
| 2014/0337950 A1 * | 11/2014 | Yang | | H04L 9/3297 |
| | | | | 726/7 |
| 2016/0174270 A1 | 6/2016 | Seok et al. | | |
| 2017/0251392 A1 * | 8/2017 | Nabetani | | H04B 7/0626 |
| 2018/0288743 A1 * | 10/2018 | Choi | | H04L 1/1614 |
| 2019/0110246 A1 * | 4/2019 | Yao | | H04W 48/14 |
| 2019/0150214 A1 * | 5/2019 | Zhou | | H04W 76/15 |
| | | | | 370/329 |
| 2022/0353916 A1 * | 11/2022 | Matsuo | | H04W 74/0816 |

FOREIGN PATENT DOCUMENTS

| | | | |
|---|---|---|---|
| CN | 101557591 | A | 10/2009 |
| CN | 101932054 | A | 12/2010 |
| CN | 102905253 | A | 1/2013 |
| CN | 105706377 | A | 6/2016 |
| CN | 106572489 | A | 4/2017 |
| CN | 105979608 | A | 11/2018 |

* cited by examiner

| First communication device | | | | Second communication device |
| --- | --- | --- | --- | --- |

101: Send a beacon frame with a plurality of transmission connections, the beacon frame includes a re-association information element; the re-association information element includes: indication information for indicating re-association request frame transmission

Fig. 1

| Element ID | Length | SSID1 | Link 1 | ...... |
| --- | --- | --- | --- | --- |

Fig. 2

| Element ID | Length | SSID1 | Time interval 1 | Link 1 | ...... |
| --- | --- | --- | --- | --- | --- |

Fig. 3

| Element ID | Length | AID Start | Number of AID | SSID 1 | Time interval 1 | Link 1 | ...... |
| --- | --- | --- | --- | --- | --- | --- | --- |

Fig. 4

RE-ASSOCIATION INDICATION METHOD AND APPARATUS, AND COMMUNICATION DEVICE

CROSS REFERENCE TO RELATED APPLICATION

The present application is a U.S. National Stage of International Application No. PCT/CN2019/124661, filed on Dec. 11, 2019, the contents of all of which are incorporated herein by reference in their entireties for all purposes.

BACKGROUND

The Institute of Electrical and Electronics Engineers established a study group (SG) to study the next-generation mainstream Wi-Fi technology, i.e. the IEEE802.11be standard. A research scope is: Wi-Fi transmission with a maximum bandwidth of 320 MHz, an aggregation and collaboration technology adopting a plurality of frequency bands, a proposed vision to improve speed and throughput by at least four times compared with the existing IEEE802.11ax standard. Main application scenarios of the new technology are video transmission, augmented reality (AR), virtual reality (VR), etc.

The aggregation and collaboration technology of the plurality of frequency bands refers to simultaneous communication of Wi-Fi devices in transmission connections of different frequency bands such as 2.4 GHz, 5.8 GHz, and 6-7 GHz, or in transmission connections of different bandwidths under the same frequency band.

SUMMARY

The present application relates but is not limited to the technical field of wireless communication, in particular to a re-association indication method and apparatus, and a communication device.

According to a first aspect of an example of the present disclosure, a re-association indication method is provided and applied to a first communication device. The method includes: sending a beacon frame of a multi-link transmission. The beacon frame includes a re-association information element. The re-association information element includes: indication information for indicating transmission of a re-association request frame.

According to a second aspect of an example of the present disclosure, a re-association indication method is provided and applied to a second communication device. The method includes: receiving a beacon frame of a multi-link transmission; and determining, according to a re-association information element contained in the beacon frame, indication information for indicating transmission of a re-association request frame.

According to a third aspect of an example of the present disclosure, a communication device is provided, and includes a processor, a transceiver, a memory and an executable program which is stored on the memory and can be run by the processor. The processor, at the time of running the executable program, executes steps of the re-association indication method according to the first aspect or the second aspect.

It should be understood that the foregoing general description and the following detailed description are used as examples and are explanatory merely, without any limitation to the examples of the present disclosure.

BRIEF DESCRIPTION OF THE DRAWINGS

The accompanying drawings, which are incorporated in and constitute a part of this specification, illustrate examples consistent with the present disclosure, and together with the description serve to explain the principles of the examples of the present disclosure.

FIG. 1 is a schematic flow chart of a re-association indication method illustrated according to an example.

FIG. 2 is a schematic structural diagram of a re-association information element illustrated according to an example.

FIG. 3 is a schematic structural diagram of another re-association information element illustrated according to an example.

FIG. 4 is a schematic structural diagram of yet another re-association information element illustrated according to an example.

DETAILED DESCRIPTION

Figure 5:
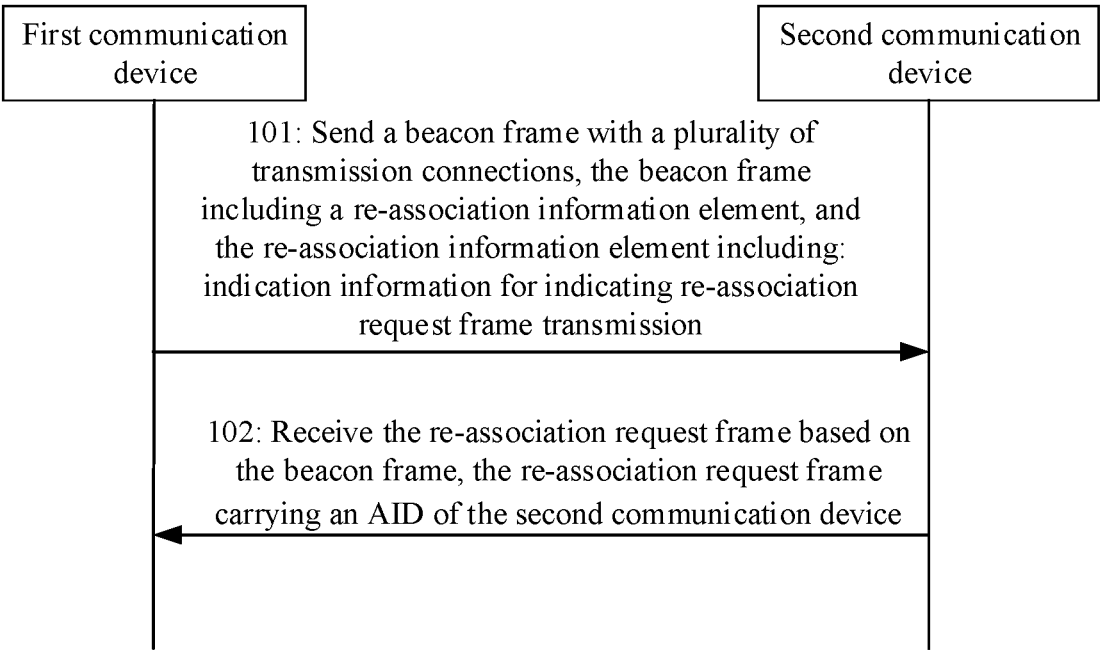
FIG. 5 is a schematic flow chart of another re-association indication method illustrated according to an example.

Examples will be described in detail, instances of which are illustrated in the accompanying drawings. When the following description refers to the accompanying drawings, the same numerals in different accompanying drawings refer to the same or similar elements unless otherwise indicated. The implementations described in the following examples do not represent all implementations consistent with examples of the present disclosure. Rather, they are merely instances of apparatus and methods consistent with some aspects of the examples of the disclosure as recited in the appended claims.

Terms used in the examples of the present disclosure are for the purpose of describing particular examples merely, and are not intended to limit the examples of the present disclosure. Singular forms "a", "the", and "said" used in the examples of the present disclosure and the appended claims are intended to include plural forms as well, unless the context clearly dictates otherwise. It should also be understood that the term "and/or" used refers to and includes any or all possible combinations of one or more associated listed items.

It should be understood that although the terms first, second, third, etc. may be used in examples of the present disclosure to describe various information, and such information should not be limited to these terms. These terms are merely used to distinguish the same type of information from each other. For example, without departing from the scope of the examples of the present disclosure, first information may also be referred to as second information, and similarly, the second information may also be referred to as the first information. Depending on the context, the word "if" used can be interpreted as "at the time of" or "when" or "in response to determining".

Executive bodies involved in the examples of the present disclosure include but are not limited to: communication devices under wireless communication networks, especially Wi-Fi networks such as IEEE802.11a/b/g/n/ac standards, and next-generation Wi-Fi networks such as an IEEE802.11be standard. The communication devices include but are not limited to: Wi-Fi routers and other wireless access point (AP) devices, wireless stations (STAs), user terminals, user nodes, mobile terminals or tablet computers, etc.

An application scenario of the examples of the present disclosure is that when a wireless station re-associates with a wireless access point, the wireless station sends a re-association request frame under a previously established link. Since the plurality of wireless stations cannot monitor each other, there is no coordination mechanism. The re-association request frame sent by one wireless station may have a communication conflict with a message frame sent by other wireless stations, which leads to retransmission of the re-association request frame. As a result, power consumption of the wireless station and the wireless access point is increased, and a utilization rate of a spectrum is lowered.

As shown in FIG. 1, an example provides a re-association indication method. The method may be applied to a first communication device in wireless communication, and includes the following steps.

Step 101: a beacon frame of a multi-link transmission is sent. The beacon frame includes a re-association information element, and the re-association information element includes indication information for indicating transmission of a re-association request frame.

Wireless communication may be Wi-Fi communication by using standards such as IEEE802.11be, the first communication device may be a wireless access point (AP) in Wi-Fi communication, and a second communication device may be a wireless station (STA) in Wi-Fi communication. The first communication device and the second communication device may communicate through the multi-link transmission.

Each transmission link occupies one transmission frequency band respectively, and the multi-link transmission occupy a plurality of transmission frequency bands. The transmission frequency bands may be a plurality of Wi-Fi working frequency bands, such as 2.4 GHz, 5.8 GHz, 6-7 GHz, etc.; or may be frequency ranges of bandwidths occupied by the transmission frequency bands. The frequency ranges of the bandwidth occupied by each transmission frequency band may belong to the same Wi-Fi working frequency band, or may belong to different Wi-Fi working frequency bands. For example, three transmission links are established between the first communication device and the second communication device. The three transmission links may belong to three Wi-Fi working frequency bands of 2.4 GHz, 5.8 GHz and 6-7 GHz respectively; or the three transmission links may all belong to the Wi-Fi working frequency band of 2.4 GHz. The three transmission links may use the same working bandwidth, for example, they may all use a working bandwidth of 20 MHz. The three transmission links may also use different working bandwidths, such as working bandwidths of 20 MHz, 40 MHz, and 80 MHz respectively.

The second communication device may associate with the first communication device after completing link verification in order to gain full access to a network. After the first communication device and the second communication device complete the association, the first communication device can record the second communication device, so as to send a message frame and the like to be transmitted to a second communication device to the correct second communication device. A re-association process refers to a process of re-associating after the second communication device and the first communication device are disconnected from an association relationship.

The second communication device may initiate the re-association process by sending the re-association request frame. The first communication device may send a re-association response frame to respond to the re-association request frame, and re-association is completed.

The first communication device may send the beacon frame in a predetermined link. The indication information indicating transmission of the re-association request frame in the re-association information element may include: a transmission resource of the re-association request frame, and/or a transmission target of the re-association request frame, etc. The predetermined link may be agreed through a transmission protocol, or may be indicated to the second communication device by the first communication device when it associates with the second communication device.

The first communication device may reasonably allocate the transmission resource and the like of the re-association request frame, for example, the multi-link transmission is distributed for transmitting the re-association request frame, and a problem that a plurality of second communication devices have communication conflicts due to sending re-association request frames on the same link is reduced.

After the second communication device receives the beacon frame, it determines the transmission resource of the re-association request frame, and/or the transmission target of the re-association request frame, etc. according to the re-association information element and through the indication information of transmission of the re-association request frame. The re-association request frame is transmitted by using the transmission resource indicated by the indication information and the like.

In this way, on the one hand, the first communication device explicitly indicates transmission of the re-association request frame, and the second communication device may transmit the re-association request frame according to monitored indication information of the first communication device, so uncertainties in transmission of the re-association request frame can be reduced. On the other hand, the re-association request frame is sent according to the indication of the first communication device, and the first communication device may allocate the resources for sending the re-association request frame. Thus, situations of conflict between the re-association request frame and other message frames can be reduced, the re-association request frame transmission reliability can be improved, generation of re-association request frame re-transmission can be reduced, and power consumption due to re-transmission can be reduced.

In some examples, the indication information for indicating transmission of the re-association request frame in step 101 includes: a service identifier and link identifier of at least one transmission link for receiving the re-association request frame.

The service identifier is used to indicate a service set identifier used by the first communication device in the transmission link for receiving the re-association request frame.

The link identifier is used to identify the transmission link for receiving the re-association request frame.

The re-association information element shown in FIG. 2 may include the service identifier and the link identifier of at least one transmission link. The service set identifier (SSID) 1 and a Link1 in FIG. 2 respectively represents the service identifier and the link identifier of the same transmission link. That is, the service identifier may be the SSID1, and the link identifier may be the Link1. The SSID1 may indicate a service set identifier used by the first communication device in a transmission link indicated by the Link1. The Link1 may use an identifier number of the transmission link or frequency band information of the transmission link to indicate the transmission link for receiving the re-association request frame.

The re-association information element may further include: an element ID for identifying the re-association information element, and a length identifier for identifying the number of bits of the re-association information element.

The multi-link transmission may respectively have their own service identifiers and link identifiers in the re-association information element. Different transmission links may use the same service identifier in the re-association information element, i.e. use the same service set identifier. The transmission links may have different link identifiers.

The second communication device may determine the transmission link for transmitting the re-association request frame according to the service identifier and the link identifier. The second communication device may first compare a service set identifier of the first communication device saved before re-association to the service set identifier indicated by the service identifier in the re-association information element. In response to determining that the service set identifier of the first communication device saved by the second communication device is the same as the service set identifier indicated by the service identifier in the re-association information element, the transmission link where the service set identifier indicated by the service identifier in the re-association information element is located, is determined to be used for sending the re-association request frame. The second communication device may determine the transmission link according to the link identifier corresponding to the service identifier, and use the transmission link to transmit the re-association request frame.

In this way, the first communication device provides the indication of the transmission link for sending the re-association request frame, and the second communication device determines the transmission link for sending the re-association request frame allocated by the first communication device according to the service set identifier before association. Thus, situations of conflict between the re-association request frame and other message frames can be reduced, the re-association request frame transmission reliability can be improved, generation of re-transmission can be reduced, and power consumption can be reduced.

In some examples, the indication information for indicating transmission of the re-association request frame in step 101 includes: a time interval identifier, used to indicate a time interval during which the first communication device receives the re-association request frame by using the transmission link.

Here, the first communication device may set one time interval identifier for each transmission link for transmitting the re-association request frame. As shown in FIG. 3, the SSID1 may indicate the service set identifier used by the first communication device in the transmission link indicated by the Link1. A time interval 1 may indicate the time interval during which the transmission link receives the re-association request frame, i.e. the time interval during which the second communication device may send the re-association request frame by using the transmission link.

The time interval identifiers of the multi-link transmission may be the same, i.e. the time interval during which each transmission link receives the re-association request frame may be the same.

After the second communication device receives the beacon frame, it may send the re-association request frame within the time interval indicated by the time interval identifier.

The first communication device sets the time interval for receiving the re-association request frame in the transmission link. On the one hand, specific indication on the time interval for sending the re-association request frame may be provided for the second communication device. On the other hand, different time intervals may be indicated for different second communication devices, so situations that communication conflicts are caused when re-association request frames are sent at the same time can be reduced.

In some examples, the indication information for indicating transmission of the re-association request frame includes association identifier (AID) range information, used to indicate a second communication device which sends the re-association request frame. The AID range information includes an AID start value and the number of AIDs supported by the transmission link.

The wireless station will re-associate after disconnecting from the network, i.e. re-association. In the re-association process, the wireless station may send a re-association request frame to the wireless access point. Main information contained in the re-association request frame is the SSID, that is, an identifier of the wireless access point that has been associated before, and the AID is not included. The AID is a unique identifier in a basic service set (BSS) allocated by the wireless access point to the wireless station in the association process.

The first communication device may set an AID range in the re-association information element. Here, the AID range refers to a range of an AID of the second communication device before re-association. The AID has uniqueness, and one AID corresponds to one second communication device. For example, a starting AID and an ending AID may be set in the re-association information element, and AIDs between the starting AID and the ending AID are the range of the AIDs. Here, the AIDs in the AID range indicated by the first communication device may be consecutive.

As shown in FIG. 4, the AID range may be represented through the AID start value and the number of the AIDs supported by the transmission link. The number of the AIDs supported by the transmission link is the total number of the AIDs that may be supported by the transmission link. The AIDs are usually represented in numbers, so the AID range may be represented through the AID start value and the total number of the AIDs.

Here, the AIDs in the AID range indicated by the first communication device may be consecutive, and the second communication device may determine each AID in the AID range through the AID start value and the number of the AIDs supported by the transmission link. After the second communication device receives the beacon frame, it determines whether its AID before re-association is in the AID range. If yes, the re-association request frame may be sent by using the transmission link indicated by the beacon frame.

In this way, the number of the second communication devices sending the re-association request frame is limited by the AID range, i.e. the number of the wireless stations simultaneously sending the re-association request frame is reduced, so communication conflicts caused by a plurality of second communication devices simultaneously sending the re-association request frame is reduced.

In some examples, as shown in FIG. 5, the re-association indication method further includes Step 102: the re-association request frame is received based on the beacon frame. The re-association request frame carries the AID of the second communication device.

The second communication device determines that its AID before re-association belongs to the AID range in the beacon frame, and the second communication device may set the AID before re-association to the re-association request frame and send the re-association request frame to the first communication device.

After the first communication device receives the re-association request frame, the AID before re-association of the communication device may be determined to be an AID of the second communication device after re-association.

In this way, a new AID does not need to be allocated, and the AID before re-association is used, so AID resources are saved.

Figure 6:
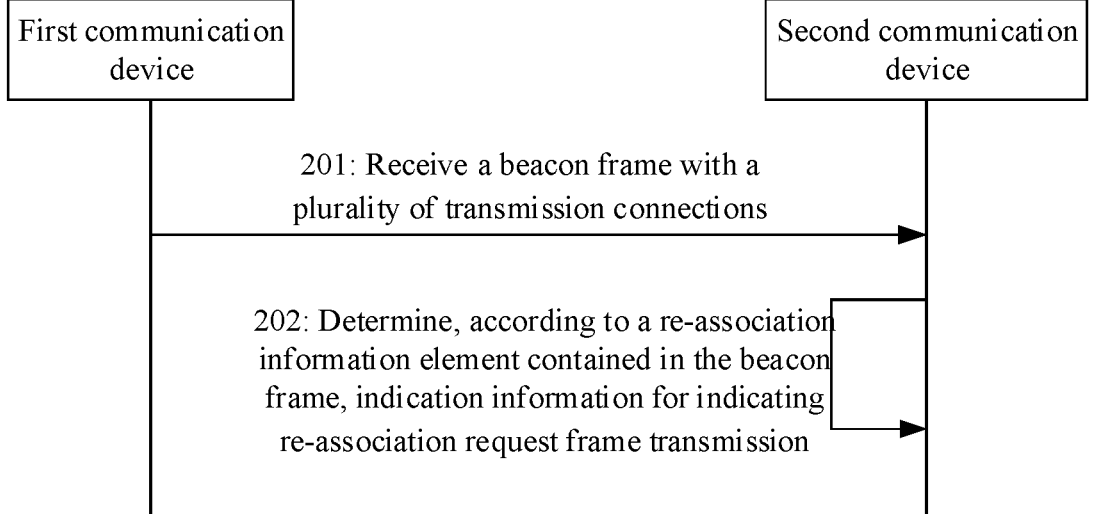
FIG. 6 is a schematic flow chart of a re-association indication method illustrated according to an example.

As shown in FIG. 6, an example provides a re-association indication method. The method may be applied to a second communication device in wireless communication, and includes Steps 201 and 202. In Step 201: a beacon frame of a multi-link transmission is received. Then in Step 202: indication information for indicating transmission of the re-association request frame is determined according to a re-association information element contained in the beacon frame.

Wireless communication may be Wi-Fi communication by using standards such as IEEE802.11be, the first communication device may be a wireless access point (AP) in Wi-Fi communication, and a second communication device may be a wireless station (STA) in Wi-Fi communication. The first communication device and the second communication device may communicate through the multi-link transmission.

Each transmission link occupies one transmission frequency band respectively, and the multi-link transmission occupy a plurality of transmission frequency bands. The transmission frequency bands may be a plurality of Wi-Fi working frequency bands, such as 2.4 GHz, 5.8 GHz, 6-7 GHz, etc.; or may be frequency ranges of bandwidths occupied by the transmission frequency bands. The frequency ranges of the bandwidth occupied by each transmission frequency band may belong to the same Wi-Fi working frequency band, or may belong to different Wi-Fi working frequency bands. For example, three transmission links are established between the first communication device and the second communication device. The three transmission links may belong to three Wi-Fi working frequency bands of 2.4 GHz, 5.8 GHz and 6-7 GHz respectively; or the three transmission links may all belong to the Wi-Fi working frequency band of 2.4 GHz. The three transmission links may use the same working bandwidth, for example, they may all use a working bandwidth of 20 MHz. The three transmission links may also use different working bandwidths, such as working bandwidths of 20 MHz, 40 MHz, and 80 MHz respectively.

The second communication device may associate with the first communication device after completing link verification in order to gain full access to a network. After the first communication device and the second communication device complete the association, the first communication device can record the second communication device, so as to send a message frame and the like to be transmitted to a second communication device to the correct second communication device. A re-association process refers to a process of re-associating after the second communication device and the first communication device are disconnected from an association relationship.

The second communication device may initiate the re-association process by sending the re-association request frame. The first communication device may send a re-association response frame to respond to the re-association request frame, and re-association is completed.

The first communication device may send the beacon frame in a predetermined link. The indication information indicating transmission of the re-association request frame in the re-association information element may include: a transmission resource of the re-association request frame, and/or a transmission target of the re-association request frame, etc. The predetermined link may be agreed through a transmission protocol, or may be indicated to the second communication device by the first communication device when it associates with the second communication device.

The first communication device may reasonably allocate the transmission resource and the like of the re-association request frame, for example, the multi-link transmission is distributed for transmitting the re-association request frame. Based on this, a problem that a plurality of second communication devices have communication conflicts due to sending re-association request frames on the same link is reduced.

After the second communication device receives the beacon frame, it determines the transmission resource of the re-association request frame, and/or the transmission target of the re-association request frame, etc. according to the re-association information element and through the indication information of transmission of the re-association request frame. The re-association request frame is transmitted by using the transmission resource indicated by the indication information and the like.

In this way, on the one hand, the first communication device explicitly indicates transmission of the re-association request frame, and the second communication device may transmit the re-association request frame according to monitored indication information of the first communication device, so uncertainties in transmission of the re-association request frame can be reduced. On the other hand, the re-association request frame is sent according to the indication of the first communication device, and the first communication device may allocate the resources for sending the re-association request frame. Thus, situations of conflict between the re-association request frame and other message frames can be reduced, the re-association request frame transmission reliability can be improved, generation of re-association request frame re-transmission can be reduced, and power consumption due to re-transmission can be reduced.

In one example, step 201 may include: a service set identifier used by a first communication device in a transmission link for receiving the re-association request frame is determined according to a service identifier in the re-association information element; and the transmission link corresponding to the service set identifier is determined according to a link identifier corresponding to the service identifier in the re-association information element. The re-association information element includes at least one service identifier.

The re-association information element shown in FIG. 2 may include the service identifier and the link identifier of at least one transmission link. The service set identifier (SSID)

1 and a Link1 in FIG. 2 respectively represents the service identifier and the link identifier of the same transmission link. The SSID1 may indicate a service set identifier used by the first communication device in a transmission link indicated by the Link1. The Link1 may use an identifier number of the transmission link or frequency band information of the transmission link to indicate the transmission link for receiving the re-association request frame.

The re-association information element may further include: an element ID for identifying the re-association information element, and a length identifier for identifying the number of bits of the re-association information element.

The multi-link transmission may respectively have their own service identifiers and link identifiers in the re-association information element. Different transmission links may use the same service identifier in the re-association information element, i.e. use the same service set identifier. The transmission links may have different link identifiers.

In one example, the method further includes: in response to determining that the determined service set identifier is the same as a service set identifier before re-association with the second communication device, the re-association request frame is sent by using the transmission link corresponding to the service set identifier.

The second communication device may determine the transmission link for transmitting the re-association request frame according to the service identifier and the link identifier. The second communication device may first compare a service set identifier of the first communication device saved before re-association to the service set identifier indicated by the service identifier in the re-association information element. In response to determining that the service set identifier of the first communication device saved by the second communication device is the same as the service set identifier indicated by the service identifier in the re-association information element, the transmission link where the service set identifier indicated by the service identifier in the re-association information element is located, is determined to be used for sending the re-association request frame. The second communication device may determine the transmission link according to the link identifier corresponding to the service identifier, and use the transmission link to transmit the re-association request frame.

In this way, the first communication device provides the indication of the transmission link for sending the re-association request frame, and the second communication device determines the transmission link for sending the re-association request frame allocated by the first communication device according to the service set identifier before association, so situations of conflict between the re-association request frame and other message frames can be reduced, the re-association request frame transmission reliability can be improved, generation of re-transmission can be reduced, and power consumption can be reduced.

In one example, the sending, in response to determining that the determined service set identifier is the same as the service set identifier before re-association with the second communication device. The re-association request frame by using the transmission link corresponding to the service set identifier includes: in response to determining that the service set identifier is the same as the service set identifier before re-association with the second communication device and that an AID before re-association with the second communication device is in an AID range indicated by AID range information in the re-association information element, the re-association request frame is sent by using the transmission link corresponding to the service set identifier. The AID range information includes: an AID start value and the number of the AIDs supported by the transmission link.

The first communication device may set an AID range in the re-association information element. Here, the AID range refers to a range of an AID of the second communication device before re-association. The AID has uniqueness, and one AID corresponds to one second communication device. For example, a starting AID and an ending AID may be set in the re-association information element, and AIDs between the starting AID and the ending AID are the range of the AIDs.

After the second communication device receives the beacon frame, it determines whether its AID before re-association is in the AID range. If yes, the re-association request frame may be sent by using the transmission link indicated by the beacon frame.

In this way, the number of the second communication devices sending the re-association request frame is limited by the AID range, so communication conflicts caused by a plurality of second communication devices simultaneously sending the re-association request frame are reduced.

As shown in FIG. 4, the AID range may be represented through the AID start value and the number of the AIDs supported by the transmission link. The number of the AIDs supported by the transmission link is the total number of the AIDs that may be supported by the transmission link. The AIDs are usually represented in numbers, so the AID range may be represented through the AID start value and the total number of the AIDs.

In one example, the determining, according to the re-association information element contained in the beacon frame, the indication information for indicating transmission of the re-association request frame includes: a time interval for sending the re-association request frame is determined according to a time interval identifier included by the re-association information element.

Here, the first communication device may set one time interval identifier for each transmission link for transmitting the re-association request frame. As shown in FIG. 3, the SSID1 may indicate the service set identifier used by the first communication device in the transmission link indicated by the Link1, and a time interval 1 may indicate the time interval during which the transmission link receives the re-association request frame, i.e. the time interval during which the second communication device may send the re-association request frame by using the transmission link.

The time interval identifiers of the multi-link transmission may be the same, i.e. the time interval during which each transmission link receives the re-association request frame may be the same.

After the second communication device receives the beacon frame, it may send the re-association request frame within the time interval indicated by the time interval identifier.

The first communication device sets the time interval for receiving the re-association request frame in the transmission link. On the one hand, specific indication on the time interval for sending the re-association request frame may be provided for the second communication device. On the other hand, different time intervals may be indicated for different second communication devices, so situations that communication conflicts are caused when re-association request frames are sent at the same time can be reduced.

In one example, the sending the re-association request frame by using the transmission link corresponding to the service set identifier includes: the re-association request frame carrying the AID before re-association with the second communication device is sent by using the transmission link corresponding to the service set identifier.

The second communication device determines that its AID before re-association belongs to the AID range in the beacon frame, and the second communication device may set the AID before re-association to the re-association request frame and send the re-association request frame to the first communication device.

After the first communication device receives the re-association request frame, the AID before re-association of the communication device may be determined to be an AID of the second communication device after re-association.

In this way, a new AID does not need to be allocated, and the AID before re-association is used, so AID resources are saved.

A specific instance is provided below in combination with any of the above examples.

1. A wireless access point, i.e. the first communication device, carries the re-association information element in the beacon frame to indicate a wireless station to be re-associated, i.e. the second communication device, to send the re-association request frame by using the transmission link indicated by the re-association information element.

The re-association information element is as shown in FIG. 3.

The SSID is an identifier of the wireless access point under one link, and facilitates rapid selection, by the station, of a transmission link corresponding to the SSID. Different transmission links have different frequency bands, and the SSID of a multi-link transmission may be the same.

The time interval used to indicate a time interval during which the wireless station sends the re-association request frame after receiving the beacon frame. The time interval of each transmission link may be equal.

The link is for identifying the transmission link used by the wireless station to send the re-association request frame. One re-association information element may indicate a multi-link transmission. In addition, in order to further reduce a probability of communication conflicts, the wireless access point may adopt an inviting manner, as shown in FIG. 4.

The AID start value is for identifying an AID allocated by the wireless access point to the wireless station before re-association. The number of AIDs refers to the number of the AIDs supported by the transmission link. The time interval may be equal in each sub-field, but the links are different in different sub-fields, so as to identify different transmission links.

2. The wireless station sends the re-association request frame.

The wireless stations send the re-association request frame by using the determined transmission link according to the SSID and/or the AID in the beacon frame monitored, information included by the re-association request frame may be the AID of the wireless station before re-association, and the wireless station does not need to re-allocate a new AID. The wireless station may also carry a newly allocated AID to the station in the re-association response frame.

Figure 7:
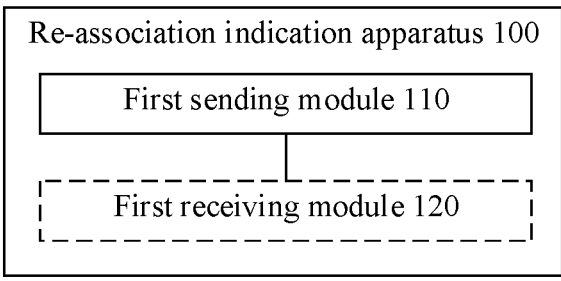
FIG. 7 is a structural block diagram of constitution of a re-association indication apparatus illustrated according to an example.

An example of the present disclosure further provides a re-association indication apparatus, applied to a first communication device in wireless communication. FIG. 7 is a structural block diagram of constitution of a re-association indication apparatus 100 provided by the example of the present disclosure. As shown in FIG. 7, the apparatus 100 includes: a first sending module 110.

The first sending module 110 is configured to send a beacon frame of a multi-link transmission. The beacon frame includes a re-association information element. The re-association information element includes: indication information for indicating transmission of the re-association request frame.

In some examples, the indication information for indicating transmission of the re-association request frame includes: a service identifier and link identifier of at least one transmission link for receiving a re-association request frame.

The service identifier is used to indicate a service set identifier used by the first communication device in the transmission link for receiving the re-association request frame. The link identifier is used to identify the transmission link for receiving the re-association request frame. In some examples, the indication information for indicating transmission of the re-association request frame includes a time interval identifier, used to indicate a time interval during which the first communication device receives the re-association request frame by using the transmission link.

In some examples, the indication information for indicating transmission of the re-association request frame includes AID range information, used to indicate a second communication device which sends the re-association request frame. The AID range information includes: an AID start value and the number of AIDs supported by the transmission link.

In some examples, the apparatus 100 further includes a first receiving module 120, configured to receive the re-association request frame based on the beacon frame. The re-association request frame carries an AID of the second communication device.

Figure 8:
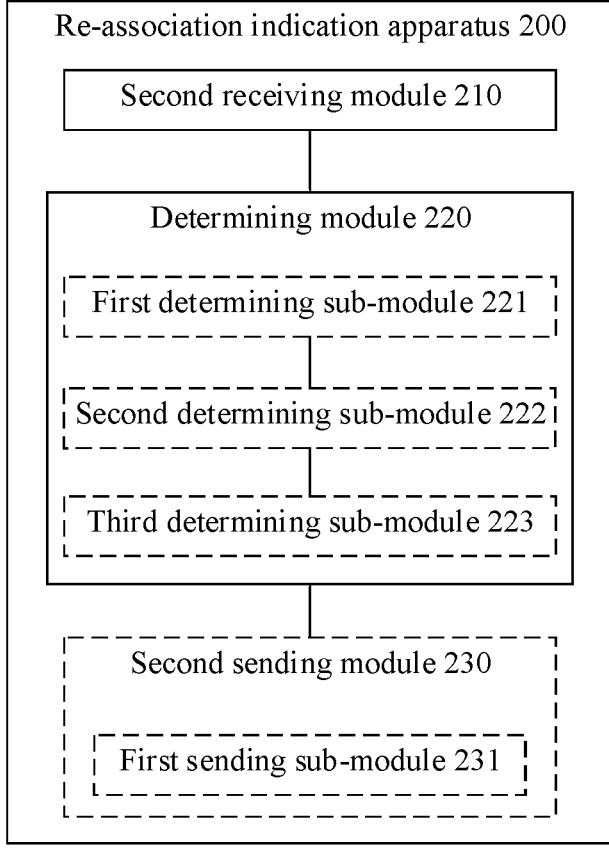
FIG. 8 is a structural block diagram of constitution of another re-association indication apparatus illustrated according to an example.

An example of the present disclosure further provides re-association indication apparatus, applied to a second communication device in wireless communication. FIG. 8 is a structural block diagram of constitution of the re-association indication apparatus 200 provided by the example of the present disclosure. As shown in FIG. 8, the apparatus 200 includes: a second receiving module 210 and a determining module 220.

The second receiving module 210 is configured to receive a beacon frame of a multi-link transmission.

The determining module 220 is configured to determine, according to a re-association information element contained in the beacon frame, indication information for indicating transmission of the re-association request frame.

In some examples, the determining module 220 includes a first determining sub-module 221, configured to determine, according to a service identifier in the re-association information element, a service set identifier used by a first communication device in a transmission link for receiving the re-association request frame; and a second determining sub-module 222, configured to determine, according to a link identifier corresponding to the service identifier in the re-association information element, the transmission link corresponding to the service set identifier.

The re-association information element includes at least one service identifier.

In some examples, the apparatus 200 further includes a second sending module 230, configured to send, in response to determining that the determined service set identifier is the same as a service set identifier before re-association with the second communication device, the re-association request frame by using the transmission link corresponding to the service set identifier.

In some examples, the second sending module 230 includes a first sending sub-module 231, configured to send, in response to determining that the service set identifier is the same as the service set identifier before re-association with the second communication device and that an AID before re-association with the second communication device is in an AID range indicated by AID range information in the re-association information element, the re-association request frame by using the transmission link corresponding to the service set identifier.

The AID range information includes: an AID start value and the number of the AIDs supported by the transmission link.

In some examples, the determining module 220 includes a third determining sub-module 223, configured to determine, according to a time interval identifier included by the re-association information element, a time interval for sending the re-association request frame.

In some examples, the second sending module 230 includes: a second sending sub-module, configured to send the re-association request frame carrying the AID before re-association with the second communication device by using the transmission link corresponding to the service set identifier.

In an example, the first sending module 110, the first receiving module 120, the second receiving module 210, the determining module 220 and the second sending module 230 may implemented by one or more central processing units (CPUs), graphics processing units (GPUs), baseband processors (BPs), application specific integrated circuits (ASICs), DSPs, programmable logic devices (PLDs), complex programmable logic devices (CPLDs), field-programmable gate arrays (FPGAs), general-purpose processors, controllers, micro controller units (MCUs), microprocessors, or other electronic component to execute the aforementioned method.

Figure 9:
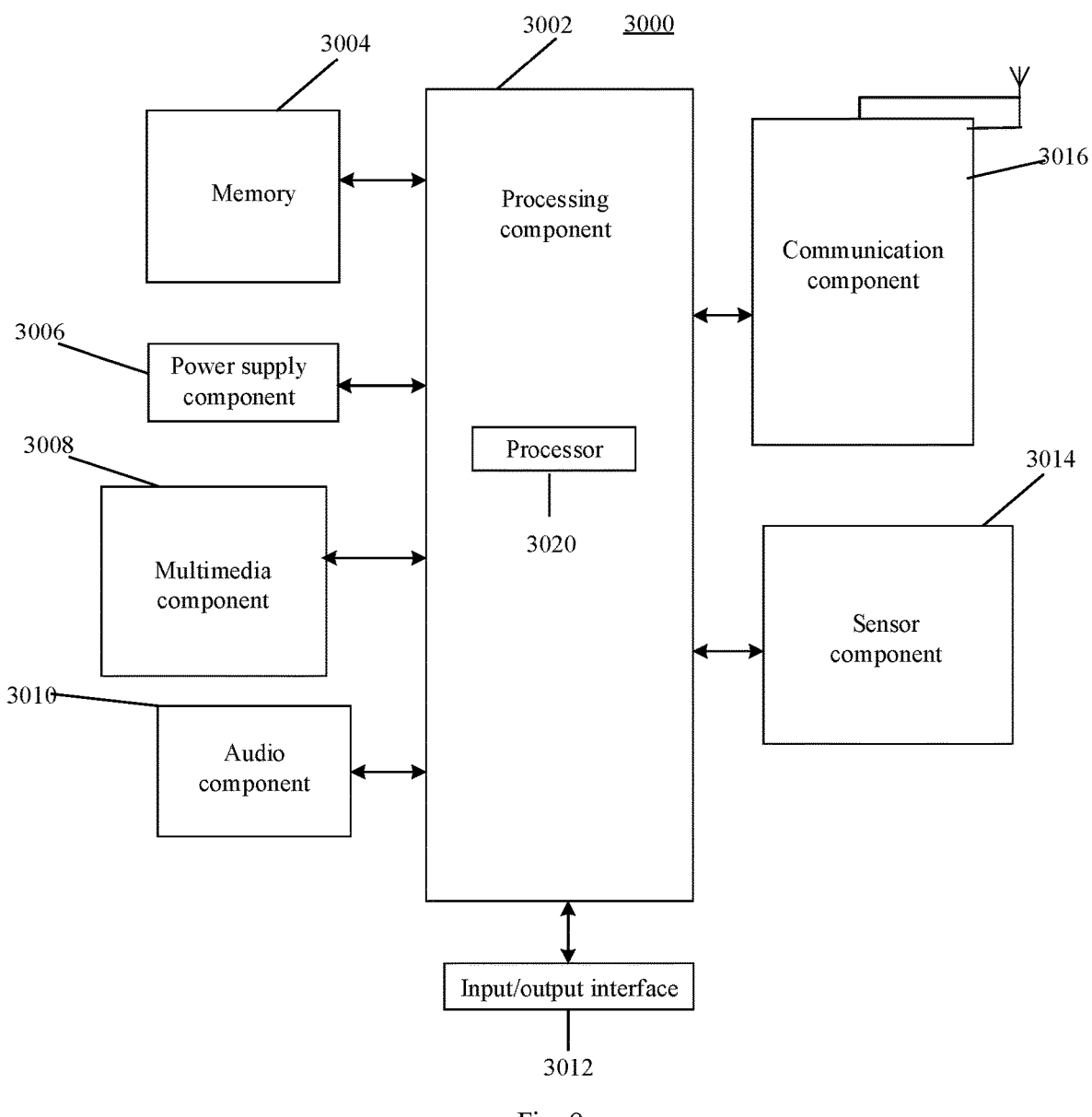
FIG. 9 is a block diagram of an apparatus for re-association indication illustrated according to an example.

FIG. 9 is a block diagram of an apparatus 3000 for re-association indication or for determining transmission block configuration parameters illustrated according to an example. For instance, the apparatus 3000 may be a mobile phone, a computer, a digital broadcasting electronic device, a messaging device, a game console, a tablet device, a medical device, a fitness device, a personal digital assistant, etc.

With reference to FIG. 9, the apparatus 3000 may include one or more of the following components: a processing component 3002, a memory 3004, a power component 3006, a multimedia component 3008, an audio component 3010, an input/output (I/O) interface 3012, a sensor component 3014, and a communication component 3016.

The processing component 3002 generally controls overall operations of the apparatus 3000, such as operations associated with display, telephone calls, data communication, camera operations, and recording operations. The processing component 3002 may include one or a plurality of processors 3020 to execute instructions to complete all or part of steps of the above method. In addition, the processing component 3002 may include one or a plurality of modules to facilitate interaction between the processing component 3002 and other components. For instance, the processing component 3002 may include a multimedia module to facilitate interaction between the multimedia component 3008 and the processing component 3002.

The memory 3004 is configured to store various types of data to support operations on the apparatus 3000. Instances of these data include instructions for any application program or method operating on the apparatus 3000, contact data, phone book data, messages, pictures, videos, etc. The memory 3004 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 3006 provides power to various components of the apparatus 3000. The power component 3006 may include a power management system, one or a plurality of power supplies, and other components associated with generation, management, and distribution of the power for the apparatus 3000.

The multimedia component 3008 includes a screen that provides an output interface between the apparatus 3000 and a user. In some examples, the screen may include a liquid crystal display (LCD) and a touch panel (TP). If the screen includes the touch panel, the screen may be implemented as a touch screen to receive input signals from the user. The touch panel includes one or a plurality of touch sensors to sense touch, wipe, and gestures on the touch panel. The touch sensor may not only sense a boundary of a touch or wipe action, but also detect a duration and pressure related to a touch or wipe operation. In some examples, the multimedia component 3008 includes a front camera and/or a rear camera. When the apparatus 3000 is in an operation mode, such as a shooting mode or a video mode, the front camera and/or the rear camera may receive external multimedia data. Each front camera and rear camera may be a fixed optical lens system or have focal length and optical zoom capabilities.

The audio component 3010 is configured to output and/or input audio signals. For instance, the audio component 3010 includes a microphone (MIC). When the apparatus 3000 is in the operation mode, such as a call mode, a recording mode, and a voice recognition mode, the microphone is configured to receive external audio signals. The received audio signals may be further stored in the memory 3004 or sent via the communication component 3016. In some examples, the audio component 3010 further includes a speaker for outputting audio signals.

The I/O interface 3012 provides an interface between the processing component 3002 and a peripheral interface module. The above peripheral interface module may be a keyboard, a click wheel, buttons, etc. These buttons may include but are not limited to: a home button, a volume button, a start button, and a lock button.

The sensor component 3014 includes one or a plurality of sensors to provide the apparatus 3000 with various aspects of status assessment. For instance, the sensor component 3014 may detect an on/off status of the apparatus 3000 and relative positioning of a component. For instance, the component is a display and a keypad of the apparatus 3000. The sensor component 3014 may also detect a position change of the apparatus 3000 or a component of the apparatus 3000, presence or absence of contact between the user and the apparatus 3000, orientation or acceleration/deceleration of the apparatus 3000, and a temperature change of the apparatus 3000. The sensor component 3014 may include a proximity sensor configured to detect presence of a nearby object when there is no physical contact. The sensor component 3014 may further include a light sensor, such as a CMOS or CCD image sensor, for use in imaging application. In some examples, the sensor component 3014 may further include an acceleration sensor, a gyroscope sensor, a magnetic sensor, a pressure sensor or a temperature sensor.

The communication component 3016 is configured to facilitate wired or wireless communication between the apparatus 3000 and other devices. The apparatus 3000 may access a wireless network based on a communication standard, such as Wi-Fi, 2G or 3G, or a combination of Wi-Fi, 2G and 3G. In an example, the communication component 3016 receives a broadcast signal or broadcast related information from an external broadcast management system via a broadcast channel. In an example, the communication component 3016 further includes a near field communication (NFC) module to facilitate short-range communication. For instance, the NFC module may be implemented based on a radio frequency identification (RFID) technology, an infrared data association (IrDA) technology, an ultra-wideband (UWB) technology, a Bluetooth (BT) technology and other technologies.

In an example, the apparatus 3000 may be implemented by one or more of an application specific integrated circuit (ASIC), a digital signal processor (DSP), a digital signal processing device (DSPD), a programmable logic device (PLD), a field programmable gate array (FPGA), a controller, a microcontroller, a microprocessor, or other electronic elements, so as to execute the above method.

In an example, a non-transitory computer-readable storage medium including instructions is further provided, for instance, a memory 3004 including the instructions. The above instructions may be executed by a processor 3020 of an apparatus 3000 to complete the above method. For instance, the non-transitory computer-readable storage medium may be a ROM, a random access memory (RAM), a CD-ROM, a magnetic tape, a floppy disk, an optical data storage device, etc.

After considering the specification and practicing the disclosure disclosed, those of skill in the art will easily think of other examples of the present disclosure. The present application is intended to cover any variations, uses, or adaptive changes of the present disclosure. These variations, uses, or adaptive changes follow the general principles of the examples of the present disclosure and include common knowledge or conventional technical means in the technical field that are not disclosed in the examples of the present disclosure. The specification and the examples are to be regarded as examples merely, and the true scope and spirit of the disclosure are pointed out by the appended claims.

It should be understood that the examples of the present disclosure are not limited to the precise structure that has been described above and shown in the drawings, and various modifications and changes can be made without departing from its scope. The scope of the examples of the present disclosure is merely limited by the appended claims.

What is claimed is:

1. An indication method, applied to a first communication device, and comprising:
 sending a beacon frame of a multi-link transmission, wherein the beacon frame comprises re-association information element, and the re-association information element comprises indication information for indicating a transmission of a re-association request frame, and
 wherein the re-association information element comprises a time interval identifier, configured to determine a time interval for transmission time of the re-association request frame of the multi-link transmission.

2. The indication method according to claim 1, wherein the re-association information element further comprises a service identifier configured to indicate a service set identifier used by the first communication device in the multi-link transmission.

3. The indication method according to claim 1, wherein the indication information for indicating transmission of the re-association request frame comprises:
 association identifier (AID) range information, configured to indicate a second communication device which sends the re-association request frame, wherein the AID range information comprises: an AID start value and a number of AIDs supported by the multi-link transmission, and
 wherein the indication method further comprises receiving the re-association request frame based on the beacon frame, wherein the re-association request frame carries an AID of the second communication device.

4. The indication method according to claim 1, wherein the re-association information element further comprises a link identifier configured to identify a corresponding link of the multi-link transmission.

5. The indication method according to claim 1, wherein a frequency range of an occupied bandwidth corresponding to each of a plurality different multi-link transmissions between the first communication device and a second communication device are different.

6. The indication method according to claim 1, wherein the re-association information element further comprises one or more subfields.

7. An indication method, applied to a second communication device, and comprising:
 receiving a beacon frame of a multi-link transmission, wherein the beacon frame comprises a re-association information element, and the re-association information element comprises indication information; and
 transmitting a re-association request frame according to the indication information, and
 wherein the re-association information element comprises a time interval identifier, configured to determine a time interval for transmission time of the beacon re-association request frame of the multi-link transmission.

8. The indication method according to claim 7, wherein the re-association information element further comprises a service identifier configured to indicate a service set identifier used by a first communication device in the multi-link transmission.

9. The indication method according to claim 8, further comprising:
 sending, in response to determining that a determined service set identifier is the same as a service set identifier before re-association with the second communication device and that an association identifier (AID) before re-association with the second communication device is in an AID range indicated by AID range information in the re-association information element, the re-association request frame carrying the AID by using the link of the multi-link transmission corresponding to the service set identifier.

10. The indication method according to claim 7, wherein the re-association information element further comprises a link identifier configured to identify a corresponding link of the multi-link transmission.

11. The indication method according to claim 7, wherein a frequency range of an occupied bandwidth corresponding to each of a plurality different multi-link transmissions between a first communication device and the second communication device are different.

12. The indication method according to claim 7, wherein the re-association information element further comprises one or more subfields.

13. A communication device, comprising a processor, a transceiver, a memory and an executable program which is stored on the memory and can be run by the processor, wherein the processor, at the time of running the executable program, executes:

sending a beacon frame of a multi-link transmission, wherein the beacon frame comprises a re-association information element, and the re-association information element comprises indication information for indicating a transmission of a re-association request frame, and wherein the re-association information element comprises a time interval identifier, configured to determine a time interval for transmission time of the beacon re-association request frame of the multi-link transmission.

14. The communication device according to claim 13, wherein the re-association information element further comprises a service identifier configured to indicate a service set identifier used by the communication device in the multi-link transmission.

15. The communication device according to claim 13, wherein the re-association information element further comprises a link identifier configured to identify a corresponding link of the multi-link transmission.

16. The communication device according to claim 13, wherein the communication device is a first communication device, and a frequency range of an occupied bandwidth corresponding to each of a plurality different multi-link transmissions between the first communication device and a second communication device are different.

17. A communication device, comprising a processor, a transceiver, a memory and an executable program which is stored on the memory and can be run by the processor, wherein the processor, at the time of running the executable program, executes:

receiving a beacon frame of a multi-link transmission, wherein the beacon frame comprises a re-association information element, and the re-association information element comprises indication information; and transmitting a re-association request frame according to the indication information, and wherein the re-association information element comprises a time interval identifier, configured to determine a time interval for transmission time of the beacon re-association request frame of the multi-link transmission.

18. The communication device according to claim 17, wherein the re-association information element further comprises a service identifier configured to indicate a service set identifier used by a first communication device in the multi-link transmission.

19. The communication device according to claim 17, wherein the re-association information element further comprises a link identifier configured to identify a corresponding link of the multi-link transmission.

20. The communication device according to claim 17, wherein the communication device is a second communication device, and a frequency range of an occupied bandwidth corresponding to each of a plurality different multi-link transmissions between a first communication device and the second communication device are different.

* * * * *